Patented Mar. 10, 1942

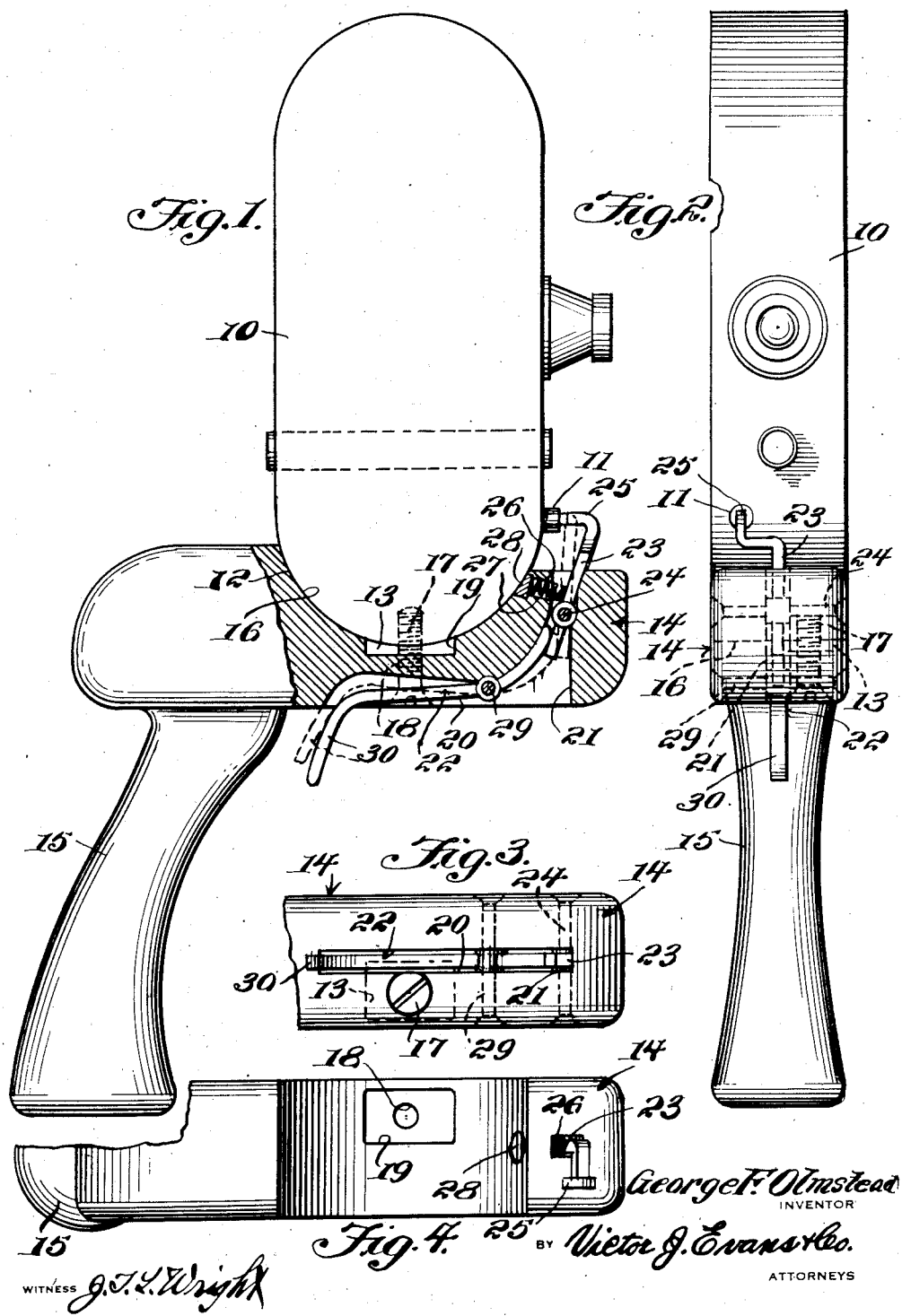

2,275,644

UNITED STATES PATENT OFFICE 2,275,644

PISTOL GRIP MOVIE CAMERA ATTACHMENT

George F. Olmstead, Owosso, Mich.

Application February 26, 1940, Serial No. 320,915

1 Claim. (Cl. 88—16)

This invention relates to a pistol grip movie camera attachment and has for an object to provide a combined support and pistol grip for operating the camera in taking pictures to prevent the fingers of the operator from getting in front of the lens when pushing in the starter button of the camera and also to permit a much firmer grip on the camera for pointing the camera than hitherto possible.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a side elevation, with parts broken away, of a camera attachment constructed in accordance with the invention supporting a movie camera.

Figure 2 is a front elevation of the parts shown in Figure 1.

Figure 3 is a fragmentary bottom plan view of the camera supporting body of the device.

Figure 4 is a top plan view of the device.

Referring now to the drawing in which like characters of reference designate similar parts in the various views, 10 designates a movie camera having the starter button 11 projecting from the front face of the camera case near the bottom thereof, the camera having the usual curved bottom 12 equipped with a threaded washer 13 to receive the usual screw of a tripod.

The device comprising the subject matter of this invention includes a body 14 of substantially rectangular cross section and of slightly greater width than the transverse width or thickness of the camera case. The rear end of the body is rounded to form a comfortable cheek rest when the eye is placed against the view finder of the camera. The body is provided with a pistol grip 15 which extends downwardly from the rear end of the body and is of sufficient length to permit the operator gripping the same firmly in one hand while the other hand, when desired, may be placed underneath the body forwardly of the pistol grip to assist in supporting the weight of the camera.

The body is provided in the top thereof, forwardly beyond the pistol grip, with a recess 16 of semi-circular longitudinal section to receive the rounded bottom 12 of the camera. The camera is secured to the body through the medium of a screw 17 which is engaged through an opening 18 extending upwardly from the bottom of the body. The screw is threadedly engaged with the conventional threaded washer 13 of the camera and to accommodate this washer a recess 19 is formed in the bottom of the opening 16 which forms the camera receiving seat.

An elongated groove 20 is formed in the bottom face of the body and this groove merges into an opening 21 which opens through the top face of the body. Mounted within the groove is a trigger 22 and mounted within the opening is a starting bar 23.

The starting bar is pivoted at a point between its ends on a pivot pin 24 which extends transversely through the body, and the starting bar extends upwardly from the body through the opening 21 in advance of the camera. The upper end of the starting bar is angled rearwardly to provide a finger 25 to adapt the bar, when operated, to actuate the starter button 11 of the camera. The starting bar is normally held in inactive position by a helical spring 26 mounted in an opening 27 which extends obliquely in the body from the camera seat 12 to the opening 21. The spring bears at the upper end against a plug 28 inserted in the opening 27 and at the lower end bears against the starting bar 23 above its pivot pin 24.

The trigger is pivoted intermediate its ends on a pivot pin 29. The forward portion of the trigger 22 curves upwardly and contacts with the rear side of the starting bar 23 below its pivot pin 24. The rear portion 30 of the trigger extends downwardly from the bottom face of the body 14 and forms a finger piece in advance of the pistol grip 15 within convenient reach of a finger of the operator's hand when the hand is closed upon the pistol grip 15.

In use the operator may hold the body 14 steady against the cheek with one hand by closing his grip upon the pistol grip 15 and with the other hand grasping the body 14 from below, and may easily sight the camera toward the object to be photographed. When the camera is to be started, the finger piece 30 of the trigger is pulled to rock the forward end of the trigger against the low end of the starting bar 23 and move the starting bar against the pressure of the spring 26 until the finger 25 of the starting bar presses the starter button 11 of the camera. When the camera is to be stopped, the finger piece 30 is released and the pressure of the spring 26 against the starting bar returns the starting bar and the trigger to normal position.

From the above description it is thought that the construction and operation of the invention will be fully understood without further explanation.

What is claimed is:

A support for a motion picture camera comprising a body, a securing screw engaged through the body and adapted to be threaded into the bottom of a motion picture camera, a pistol grip extending downwardly from the rear end of the body, the rear end of the body extending beyond the pistol grip and being rounded to form a cheek rest, a trigger pivoted on the bottom of the body having a finger piece disposed in advance of the pistol grip, and a starting bar pivotally engaged intermediate its ends on said body in advance of the trigger, one end of the starting bar being in overlapping relationship with the trigger and the other end being disposed above the body, and a spring in the body engaging the starting bar and normally holding the trigger inactive, actuation of the trigger moving the starting bar to engage and depress the starting button of the camera.

GEORGE F. OLMSTEAD.